United States Patent [19]
Leimgruber et al.

[11] 3,920,746
[45] Nov. 18, 1975

[54] PREPARATION OF TERTIARY-BUTYL ARYL ETHERS

[75] Inventors: Willy Leimgruber, Montclair; Ernest Mohacsi, Nutley, both of N.J.

[73] Assignee: Hoffmann-La Roche Inc., Nutley, N.J.

[22] Filed: Jan. 16, 1974

[21] Appl. No.: 433,643

Related U.S. Application Data

[62] Division of Ser. No. 208,952, Dec. 16, 1971, abandoned.

[52] U.S. Cl. .......................... 260/584 C; 260/584 R
[51] Int. Cl.$^2$ ............... C07C 91/02; C07C 93/02; C07C 93/10
[58] Field of Search ..................... 260/584 R, 584 C

[56] References Cited
UNITED STATES PATENTS
3,239,519    3/1966    Winberg ..................... 260/584 R X

*Primary Examiner*—Paul F. Shaver
*Attorney, Agent, or Firm*—Samuel L. Welt; Bernard S. Leon; William G. Isgro

[57] ABSTRACT

Tertiary-butyl aryl ethers are prepared by reacting the corresponding phenol or phenolic compound with N,N-dimethylformamide di-t-butyl acetal under basic conditions. The preparation of substantially pure N,N-dimethylformamide di-t-butyl acetal by the acid-catalyzed trans-acetalization of N,N-dimethylformamide dimethyl acetal with t-butanol is also described.

3 Claims, No Drawings

PREPARATION OF TERTIARY-BUTYL ARYL ETHERS

This is a division, of application Ser. No. 208,952 filed Dec. 16, 1971 now abandoned.

BACKGROUND OF THE INVENTION

Conventional methods of the prior art for the preparation of t-butyl aryl ethers, for example, those described by D. R. Stevens, J. Org. Chem., 20, 1232 (1955) and the references cited therein, require strong acid catalysis, which in addition to causing certain compounds to decompose or rearrange, results in the obtainment of the desired t-butyl ethers in very poor yields (1–33 percent). The process of the invention substantially increases the yield of the desired t-butyl aryl ethers, mainly because the reaction is carried out in the presence of a basic reagent, which does not cause rearrangement or decomposition of the product.

Impure N,N-dimethylformamide di-t-butyl acetal has been previously prepared and described by Arnold et al., in Z. Arnold and M. Kornilov, "Collection Czechoslov. Chem. Commun." 29, 645–651 (1964). It has now been found unexpectedly, (cf. "Collection Czechoslov. Chem. Commun." 29, 645 [1964]), that through trans-acetalization of N,N-dimethylformamide dimethyl acetal with t-butanol, N,N-dimethylformamide di-t-butyl acetal can be prepared which is substantially pure.

BRIEF SUMMARY OF THE INVENTION

The invention relates to the preparation of t-butyl aryl ethers by a process which comprises reacting the corresponding phenol or phenolic compound with N,N-dimethylformamide di-t-butyl acetal under basic conditions.

In another aspect, the invention relates to the preparation of N,N-dimethylformamide di-t-butyl acetal by a process which comprises the acid-catalyzed trans-acetalization of N,N-dimethylformamide dimethyl acetal with t-butanol, involving the simultaneous removal of the formed methanol, whereby N,N-dimethylformamide di-t-butyl acetal is obtained.

In yet another aspect, the invention relates to substantially pure N,N-dimethylformamide di-t-butyl acetal.

DETAILED DESCRIPTION OF THE INVENTION

In one aspect, the invention relates to a process for the preparation of aromatic compounds having at least one t-butoxy group on the aromatic nucleus which comprises reacting a phenolic compound with N,N-dimethylformamide di-t-butyl acetal under basic conditions.

This process aspect of the invention can be particularly illustrated by Reaction Scheme I, which follows:

REACTION SCHEME I

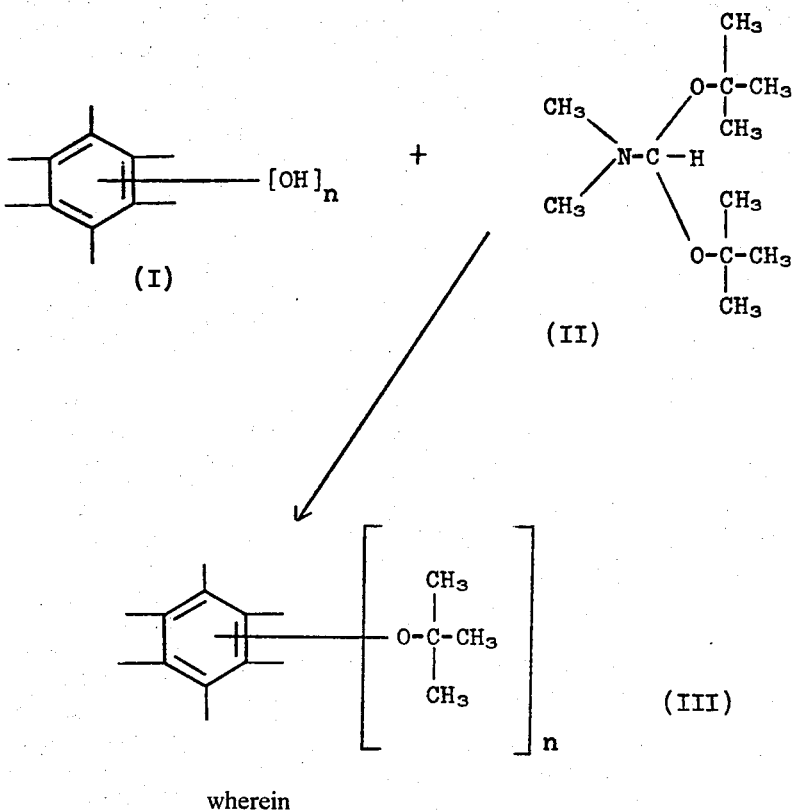

wherein

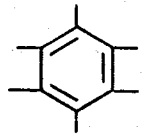

is the aromatic nucleus of a hydrocarbon radical, such as, for example, phenyl, naphthyl, phenanthrenyl, tetrahydronaphthyl, tetra-, hexa- and octa-hydrophenanthrenyl, 2,6-methano-3-benzazocinyl, 10,4a-imino-ethanophenanthrenyl, 4aH-8,9c-iminoethano-phenantro[4,5-b,c,d]furyl, or the like, and $n$ is a whole number from 1 to 3. It is to be understood that the hydrocarbon radical can be unsubstituted or can bear one or more substituents, such as, for example, acetoxy, halogen, hydroxy, acylamido, lower alkoxy, lower alkyl, nitro, carboxy or the like. Furthermore, it is to be understood that the hydrocarbon radical can contain one or more hetero atoms, such as, for example, nitrogen, oxygen, sulfur or the like.

As used herein, the term "lower alkyl" denotes a straight or branched saturated hydrocarbon containing 1 to 5 carbon atoms, for example, methyl, ethyl, propyl, isopropyl, butyl, t-butyl, neopentyl, pentyl and the like; preferred is methyl. The term "lower alkoxy" denotes an alkyl ether group in which the lower alkyl group is as described above, for example, methoxy, ethoxy, propoxy, pentoxy, and the like; preferred is methoxy. The term "halogen" denotes all the halogens, i.e., bromine, chlorine, fluorine and iodine; preferred are chlorine and bromine. The term "acyl" denotes an "alkanoyl" group derived from an aliphatic carboxylic acid of 1 to 7 carbon atoms, for example, formyl, acetyl, propionyl and the like; and an "aroyl" group derived from an aromatic carboxylic acid, such as benzoyl and the like.

Exemplary of the phenolic hydrocarbons which can be utilized in the process of the invention are: phenol, naphthol, 3-hydroxy-N-methylmorphinan, 3-hydroxy-N-formylmorphinan, 3-hydroxymorphinan, morphine, o-, m- and p-cresol, p-aminophenol, o-nitrophenol, 2,4,6-trinitrophenol, p-acetamidophenol, thymol, 2,6-di-t-butyl-4-methylphenol, 2-hydroxy-4-isopropyltoluene, guaiacol, eugenol, pyrocatechol, resorcinol, hydroquinone, 2,4,6-trinitroresorcinol, pyrogallol, phloroglucinol, o-, m- and p-bromophenol, and the like.

Exemplary of the products of formula III are: (+)-3-t-butoxy-N-methylmorphinan, (−)-3-t-butoxy-N-methylmorphinan, (+)-3-t-butoxymorphinan, 3-t-butoxy-7,8-didehydro-4,5α-epoxy-17-methylmorphinan-6α-ol, t-butyl phenyl ether, t-butyl l-naphthyl ether, o-, m- and p-t-butoxytoluene, 1-t-butoxy-2-nitrobenzene, 1-t-butoxy-3-nitrobenzene, 1-t-butoxy-4-nitrobenzene, 1-t-butoxy-2,4,6-trinitrobenzene, 1-bromo-2-t-butoxybenzene, 1-bromo-3-t-butoxybenzene, 1-bromo-4-t-butoxybenzene, 1,2-di-t-butoxy-benzene, 1-t-butoxy-2-methoxybenzene, 1,3-di-t-butoxy-4-n-hexylbenzene, 1,4-di-t-butoxybenzene, 1,2,3,-tri-t-butoxybenzene, 1,3,5-tri-t-butoxybenzene, p-t-butoxy-acetanilide and the like.

In the process of the invention, the phenolic compound is reacted with N,N-dimethylformamide di-t-butyl acetal at an elevated temperature; that is, at a temperature in the range of between about 80°C. and the reflux temperature of the reaction mixture. Preferably, the reaction is carried out at reflux temperature of the reaction mixture.

N,N-Dimethylformamide di-t-butyl acetal is reacted with the phenolic compound in equimolar or greater than equimolar ratios; preferably, an excess of N,N-dimethylformamide di-t-butyl acetal is utilized, for example, from about 2 to about 5 moles of acetal for each mole of phenolic compound. Since an excess of N,N-dimethylformamide di-t-butyl acetal is utilized in the process of the invention, it can also act as a solvent for the phenolic compound. Thus, the utilization of additional inert solvents is not generally required but is not precluded.

The reaction of the phenolic compound and N,N-dimethylformamide di-t-butyl acetal is carried out under basic conditions. Since N,N-dimethylformamide di-t-butyl acetal is basic, the reaction mixture is maintained on the basic side without any additional manipulative steps and/or added substances. After the reaction is completed, the reaction product, i.e., the desired aromatic compound having at least one t-butoxy group in its aromatic nucleus, can be separated from the reaction mixture by conventional methods as, for example, filtration, crystallization, distillation or the like.

Since the phenolic starting material may possess, in addition to hydroxy, various other groups which can react with N,N-dimethylformamide di-t-butyl acetal, it may be desirable to protect such groups. A carboxylic acid group can be esterified utilizing conventional methods. When and if desired, the ester group can be converted again to the carboxylic acid by base catalyzed hydrolysis. A secondary amine group can be protected by an electron-withdrawing group such as formyl, acetyl and the like, utilizing known procedures. When and if desired, the electron-withdrawing group can be removed by base catalyzed hydrolysis, for example, utilizing sodium hydroxide. The hydroxy group of an allylic alcohol can be acetylated by known procedures. When and if desired, the protecting group can be removed by base catalyzed hydrolysis.

In the alternative, it is possible to allow N,N-dimethylformamide di-t-butyl acetal to also react with a carboxy group to form the corresponding t-butyl ester.

In another aspect, the invention relates to the preparation of substantially pure N,N-dimethylformamide di-t-butyl acetal by a process which comprises the acid-catalyzed trans-acetalization of N,N-dimethylformamide dimethyl acetal with t-butanol.

More particularly, the N,N-dimethylformamide dimethyl acetal is trans-acetalized with t-butanol in the presence of a catalytic amount of weak acid, which preferably is a sterically highly hindered phenol such as 2,4,6-tri-t-butylphenol or 2,6-di-t-butylphenol. The catalytic amount may be in the range of about 0.01 mole to about 0.1 mole per mole of N,N-dimethylformamide dimethyl acetal; most preferred is 0.01 mole. Conveniently, as excess of t-butanol is utilized. Such excess may comprise from about 2 to about 4 moles of t-butanol per mole of N,N-dimethylformamide dimethyl acetal. The trans-acetalization is carried out at a temperature in the range of about 110° to about 115°. The methanol formed in the trans-acetalization reaction is removed from the reaction mixture by continuous distillation.

The t-butyl aryl ethers produced by the process of the invention are useful and generally known compounds. For example, β-naphthyl t-butyl ether is a useful compound for perfumes. p-t-Butoxy-acetanilide has shown potent and long-lasting antipyretic-analgesic activity. The t-butyl aryl ethers are also useful as intermediates in the preparation of known and useful end products.

The following examples further illustrate the invention. All temperatures are in degrees Centigrades, unless otherwise mentioned.

EXAMPLE 1

Preparation of (+)-3-t-butoxy-N-methylmorphinan from (+)-3-hydroxy-N-methylmorphinan A mixture of 12.0 g. of (+)-3-hydroxy-N-methylmorphinan and 19.0 g. of N,N-dimethylformamide di-t-butyl acetal was heated at 100°–110° for 2 hours under an atmosphere of nitrogen, during which time a clear red solution was obtained. The two additional 9.5 g. portions of N,N-dimethylformamide di-t-butyl acetal were added successively at 2 hour intervals, and heating was continued for an additional 6 hours. The excess of reagent was removed under vacuum, and the residue was diluted with ethyl acetate (300 ml.). The resulting solution was washed successively with 2N sodium hydroxide (2 × 60 ml.) and water. The organic phase was dried and evaporated, and the residue was distilled to give 8.0 g. (55 percent) of pure (+)-3-t-butoxy-N-methylmorphinan, bp 185°–200°/0.1 mm, $[\alpha]_D^{25}$ + 50.0° (c 0.98, MeOH).

Analysis Calcd. for $C_{21}H_{31}NO$ (313.49): C, 80.46; H, 9.97; N, 4.47. Found: C, 80.57; H, 9.96; N, 4.68.

EXAMPLE 2

Preparation of (+)-3-t-butoxy-N-methylmorphinan D-tartrate hydrate

A mixture of 8.7 g. of (+)-3-t-butoxy-N-methylmorphinan, 4.1 g. of D-tartaric acid and 25 ml. of isopropanol was heated on the streambath until solution occurred, and then allowed to stand at room temperature overnight. The crystals which formed were separated by filtration and were recrystallized from isopropanol to give 10.0 g. (95 percent) of (+)-3-t-butoxy-N-methylmorphinan D-tartrate hydrate, mp 105°–107° (dec.), $[\alpha]_D^{25}$ + 36.0° (c 1.06, MeOH).

Analysis Calcd. for $C_{21}H_{31}NO \cdot C_4H_6O_6 \cdot H_2O$ (481.55): C, 62.35; H, 8.16; N, 2.91. Found: C, 62.39; H, 8.47; N, 3.20.

EXAMPLE 3

Preparation of (−)-3-t-butoxy-N-methylmorphinan from (−)-3-hydroxy-N-methylmorphinan A mixture of 11.3 g. of (−)-3-hydroxy-N-methylmorphinan and 18.1 g. of N,N-dimethylformamide di-t-butyl acetal was heated at 100°–110° for 2 hours under nitrogen, during which time a clear red solution was obtained. Then two additional 9.0 g. portions of N,N-dimethylformamide di-t-butyl acetal were added successively at 2 hour intervals, and heating was continued for an additional 6 hours. The excess of reagent was removed under vacuum, and the residue was diluted with ethyl acetate (300 ml.). The resulting solution was washed successively with 2N sodium hydroxide (2 × 60 ml.) then with water. Thereafter, the organic phase was dried and evaporated and the residue was distilled to give 8.1 g. (59 percent) of (−)-3-t-butoxy-N-methylmorphinan, bp 180°–200°/0.1 mm, $[\alpha]_D^{25}$ −49.3° (c 0.93, MeOH).

Analysis Calcd. for $C_{21}H_{31}NO$ (313.49): C, 80.46; H, 9.97; N, 4.47. Found: C, 80.24; H, 9.88; N, 4.77.

EXAMPLE 4

Preparation of (−)-3-t-butoxy-N-methylmorphinan L-tartrate hydrate

A mixture of 7.1 g. of (−)-3-t-butoxy-N-methylmorphinan, 3.4 g. of L-tartaric acid, and 25 ml. of hot isopropanol was heated on a steambath until solution occurred and then allowed to stand at room temperature overnight. The crystals which formed were separated by filtration and recrystallized from isopropanol to give 9.1 g. of pure (−)-3-t-butoxy-N-methylmorphinan L-tartrate hydrate, mp 105°–107° (dec.), $[\alpha]_D^{25}$ −36.3° (c 0.99, MeOH).

Analysis Calcd. for $C_{21}H_{31}NO \cdot C_4H_6O_6 \cdot H_2O$ (481.55): C, 62.35; H, 8.16; N, 2.91. Found: C, 62.20; H, 8.13; N, 2.86.

EXAMPLE 5

Preparation of (+)-3-methoxymorphinan (+)-3-Methoxy-N-formylmorphinan, 78.4 g. was dissolved in 2 l. of methanol and 800 ml. of 2.5N aqueous sodium hydroxide was added. After this mixture has been heated under reflux for 24 hours, the methanol was removed under reduced pressure and the resulting aqueous suspension was extracted with methylene chloride (3 × 750 ml.). The combined methylene chloride extracts were washed with water and dried. Removal of the solvent under vacuum yielded 63.9 g. (90 percent) of crude (+)-3-methoxymorphinan. A sample of this compound was distilled, bp 148°–150°/0.05 mm, $[\alpha]_D^{25}$ + 31.97° (c 1.1, MeOH).

Analysis Calcd. for $C_{17}H_{23}NO$ (257.35): C, 79.33; H, 9.01; N, 5.54. Found: C, 79.20; H, 8.81; N, 5.58.

EXAMPLE 6

Preparation of (+)-3-hydroxymorphinan from (+)-3-methoxymorphinan (+)-3-Methoxymorphinan hydrobromide, 10.0 g. in 50 ml. of 48 percent HBr was refluxed for 2 hours. The cooled solution was made basic with concentrated ammonium hydroxide. The precipitate was filtered and dried to give 7.2 g. (100 percent) of crude (+)-3-hydroxymorphinan. A sample of this compound was recrystallized from methanol, mp 273°–274°, $[\alpha]_D^{25}$ + 38.5° (c 1.0, MeOH).

Analysis Calcd. for $C_{16}H_{21}NO$ (243.33): C, 78.97; H, 8.70; N, 5.76. Found: C, 79.24; H, 8.68; N, 5.92.

EXAMPLE 7

Preparation of (+)-3-hydroxy-N-formylmorphinan from (+)-3-hydroxymorphinan

A solution of 2.0 g. of (+)-3-hydroxymorphinan in a mixture of 3.5 ml. of formic acid and 2.2 ml. of triethylamine was heated under reflux for 16 hours. The reaction mixture was concentrated under reduced pressure and the residue was dissolved in chloroform and washed successively with dilute hydrochloric acid and water. The chloroform solution was dried and concentrated to give 1.8 g. (81 percent) of crude (+)-3-hydroxy-N-formylmorphinan. A sample of this compound was distilled, bp 240°–242°/0.25 mm, $[\alpha]_D^{25}$ + 184° (c 1, MeOH).

Analysis Calcd. for $C_{17}H_{21}NO_2$ (271.34): C, 75.21; H, 7.80; N, 5.16. Found: C, 75.14; H, 7.71; N, 5.23.

EXAMPLE 8

Preparation of (+)-3-t-butoxy-N-formylmorphinan from (+)-3-hydroxy-N-formylmorphinan A mixture of 3.0 g. of (+)-3-hydroxy-N-formylmorphinan and 9.0 g. of N,N-dimethylformamide di-t-butyl acetal was heated under reflux for 5 hours, during which time a dark solution was obtained. The excess of reagent was removed under reduced pressure and the residue was dissolved in ethyl acetate (35 ml.). The resulting solution was washed successively with 2N sodium hydroxide (3 × 20 ml.) and water. The ethyl acetate solution was dried and concentrated under vacuum to give 1.1 g. (30 percent) of crude (+)-3-t-butoxy-N-formylmorphinan. A sample of this compound was distilled, bp 170°–175°/0.2 mm.

Analysis Calcd. for $C_{21}H_{29}NO_2$ (327.44): C, 77.02; H, 8.93, N, 4.28. Found: C, 76.66; H, 9.12; N, 4.46.

EXAMPLE 9

Preparation of (+)-3-t-butoxymorphinan from (+)-3-t-butoxy-N-formylmorphinan 0.9 g. of (+)-3-t-Butoxy-N-formylmorphinan was dissolved in 21 ml. of methanol and 7 ml. of 2.5N aqueous sodium hydroxide was added. After this mixture had been heated under reflux for 48 hours, the methanol was removed under reduced pressure and the resulting aqueous suspension was extracted with methylene chloride (60 ml.). The combined methylene chloride extracts were washed with water and dried. Removal of solvent under vacuum yielded 0.8 g. (97 percent) of crude (+)-3-t-butoxymorphinan. The base (800 mg.) on addition with D-tartaric acid (400 mg.) in ethanol (7 ml.) afforded 680 mg. of salt, which after two recrystallizations from ethanol yielded 540 mg. (46 percent) of pure (+)-3-butoxymorphinan D-tartrate, mp 207°–208° (dec.), $[\alpha]_D^{25} + 37.4°$ (c 1.05, MeOH).

Analysis Calcd. for $C_{20}H_{29}NO \cdot C_4H_6O_6$ (449.52): C, 64.12; H, 7.85; N, 3.13. Found: C, 63.99; H, 7.68; N, 3.37.

EXAMPLE 10

Preparation of $O^{3,6}$-diacetylmorphine from morphine 25.6 g. of Morphine were stirred with acetic anhydride (120 ml.) and pyridine (120 ml.) at room temperature for 48 hours. The excess of acetic anhydride and pyridine were removed at 30° under vacuum and to the residue, water (200 ml.) was added. The aqueous suspension was made basic with sodium bicarbonate and was extracted with chloroform (3 × 200 ml.). The combined extracts were dried, and after evaporation of the chloroform, the residue was recrystallized from ethyl acetate to give 28.6 g. (86 percent) of $O^{3,6}$-diacetylmorphine, mp 172°–174°.

EXAMPLE 11

Preparation of $O^6$-monoacetylmorphine from $O^{3,6}$-diacetylmorphine

A solution of 28.6 g. of $O^{3,6}$-diacetylmorphine in ethanol (390 ml.) was treated with concentrated aqueous solution of hydroxylamine hydrochloride (10.4 g.). The reaction mixture was stirred at room temperature for 15 minutes during which period the hydrochloride of monoacetylmorphine crystallized. The solvent was removed under reduced pressure, and to the residue was added water (200 ml.). The solution was made basic with concentrated ammonium hydroxide and extracted thoroughly with chloroform (3 × 200 ml.). Evaporation of chloroform and crystallization of the residue from ethyl acetate (500 ml.) gave 25.4 g. (100 percent) of $O^6$-monoacetylmorphine, mp 188°–190°

EXAMPLE 12

Preparation of 3-t-butoxy-7,8-didehydro-4,5α-epoxy-17-methylmorphinan-6α-ol trans-3-dimethylamino-2-propenoic acid ester from $O^6$-monoacetylmorphine and N,N-dimethylformamide di-t-butyl acetal A mixture of 23.0 g. of $O^6$-monoacetylmorphine and 32.0 g. of N,N-dimethylformamide di-t-butyl acetal was heated at 100°–110° for 30 minutes under nitrogen, during which time a clear solution formed. Then an additional two 16.0 g. portions of N,N-dimethylformamide di-t-butyl acetal were added successively in 2 hour intervals and the heating was continued for an additional 6 hours. The excess of reagent was removed under reduced pressure and the residue was dissolved in ethyl acetate (500 ml.) and washed successively with 2N sodium hydroxide (3 × 75 ml.) and water (70 ml.). The ehtyl acetate solution was dried and concentrated to give 15.5 g. (50 percent) of crude 3-t-butoxy-7,8-didehydro-4,5α-epoxy-17-methylmorphinan-6α-ol trans-3-dimethylamino-2-propenoic acid ester. A sample of this compound was distilled, bp 220°–225°/0.1 mm.

Analysis Calcd. for $C_{26}H_{34}N_2O_4$ (438.57): C, 71.20; H, 7.82; N, 6.39. Found: C, 71.04; H, 8.02; N, 6.46.

EXAMPLE 13

Preparation of 3-t-butoxy-7,8-didehydro-4,5α-epoxy-17-methylmorphinan-6α-ol from 3-t-butoxy-7,8-didehydro-4,5α-epoxy-17-methylmorphinan-6α-ol trans-3-dimethylamino-2-propenoic acid ester 15.0 g. of 3-t-Butoxy-7,8-didehydro-4,5α-epoxy-17-methylmorphinan-6α-ol trans-3-dimethylamino-2-propenoic acid ester was dissolved in 600 ml. of ethanol and 280 ml. of 2N aqueous sodium hydroxide were added. After this mixture had been heated under reflux for 24 hours, the ethanol was removed under reduced pressure and the resulting aqueous suspension was extracted with chloroform (3 × 300 ml.). The combined organic layers were washed with 2N aqueous sodium hydroxide (100 ml.), then with water (120 ml.) and dried. The solvent was removed under vacuum and the residue distilled (bp 220°–230°/0.2 mm.) to give 10.69 g. (92 percent) of 3-t-butoxy-7,8-didehydro-4,5α-epoxy-17-methylmorphinan-6α-ol, $[\alpha]_D^{25}$ −79.8° (c 0.8, MeOH).

Analysis Calcd. for $C_{21}H_{27}NO_3$ (341.46): C, 73.87; H, 7.97; N, 4.10. Found: C, 73.70; H, 8.14; N, 3.93.

EXAMPLE 14

Preparation of 3-t-butoxy-7,8-didehydro-4,5α-epoxy-17-methylmorphinan-6α-ol D-tartrate diethanolate from 3-t-butoxy-7,8-didehydro-4,5α-epoxy-17-methylmorphinan-6α-ol 10.9 g. of 3-t-Butoxy-7,8-didehydro-4,5α-epoxy-17-methylmorphinan-6α-ol was dissolved in 25 ml. of hot ethanol and a hot solution of D-tartaric acid, 4.6 g., in 25 ml. of ethanol was added. The tartrate was allowed to crystallize and was separated by filtration. Recrystallization from ethanol (140 ml.) gave 14.8 g. (82 percent) of 3-t-butoxy-7,8-didehydro-4,5α-epoxy-17- methylmorphinan-6α-ol D-tartrate diethanolate, mp 105°–106° (dec.), $[\alpha]_D^{25}$ −28.2° (c 1.18, MeOH).

Analysis Calcd. for $C_{21}H_{27}NO_3 \cdot C_4H_6O_6 \cdot C_4H_{12}O_2$ (583.68): C, 59.67; H, 7.77; N, 2.40. Found: C, 59.69; H, 7.69; N, 2.39.

EXAMPLE 15

Preparation of morphine from 3-t-butoxy-7,8-didehydro-4,5α-epoxy-17-methylmorphinan-6α-ol 120 mg. of 3-t-Butoxy-7,8-didehydro-4,5α-epoxy-17-methylmorphinan-6α-ol in 1N aqueous hydrochloric acid was stirred at room temperature for 17 hours. The solution was made basic with concentrated ammonium hydroxide and the product was collected by filtration. Recrystallization from ethanol gave 90 mg. (90 percent) of morphine, mp 247°–249°. Its mixed melting point with an authentic sample was undepressed.

EXAMPLE 16

Preparation of methoxymethylmorphine from morphine 18.0 g. of A suspension of sodium morphine and 60 ml. of chloroform (dry) were stirred at room temperature while chloromethyl methyl ether (5.1 g.) was added dropwise over a period of 30 minutes. The suspension was stirred at this temperature for 16 hours, then diluted with chloroform (300 ml.). The chloroform solution was washed with 2N sodium hydroxide (3 × 60 ml.), water (60ml.), and dried. Removal of the solvent under vacuum gave 13.7 g. (70 percent) of crude methoxymethylmorphine. A sample of this compound was distilled, bp 160°–165°/0.07 mm, and mp 91°–93°, $[\alpha]_D^{25}$ −123.8° (c 0.419, MeOH).

Analysis Calcd. for $C_{19}H_{23}NO_4$ (329.37): C, 69.28; H, 7.04; N, 4.25. Found: C, 69.58; H, 7.01; N, 4.26.

EXAMPLE 17

Preparation of 7,8-didehydro-4,5α-epoxy-17-methyl-6α-(2,2,2-trichloroethylcarbonyldioxy)-3-methoxymethylmorphinan from methoxymethylmorphine and 2,2,2-trichloroethyl chloroformate 11.0 g. of 2,2,2-trichloroethyl chloroformate was added dropwise to a stirred solution of 12.2 g. of methoxymethylmorphine in 130 ml. of dry pyridine at ice bath temperature over a period of 45 minutes. Then, the reaction mixture was stirred at room temperature for 20 minutes. The pyridine was removed under vacuum and the residue was dissolved in water (60 ml.). The aqueous solution was made basic by concentrated ammonium hydroxide and extracted with chloroform (3 × 80 ml.). The chloroform solution was washed with water, dried, and evaporated. The residue was recrystallized from ethyl acetate-hexane to give 11.5 g. (62 percent) of 7,8-didehydro-4,5α-epoxy-17-methyl-6α-(2,2,2-trichloroethylcarbonyldioxy)-3-methoxymethylmorphinan, mp 124°–125°, $[\alpha]_D^{25}$ −164.0° (c 1.10, MeOH).

Analysis Calcd. for $C_{22}H_{24}Cl_3NO_6$ (504.78): C, 52.47; H, 4.79; N, 2.78. Found: C, 52.63; H, 4.68; N, 2.62.

EXAMPLE 18

Preparation of 7,8-didehydro-4,5α-epoxy-17-methyl-6α-(2,2,2-trichloroethylcarbonyldioxy)morphinan-3-ol from 7,8-didehydro-4,5α-epoxy-17-methyl-6α-(2,2,2-trichloroethylcarbonyldioxy)-3-methoxymethylmorphinan 11.1 g. of 7,8-Didehydro-4,5α-epoxy-17-methyl-6α-(2,2,2-trichloroethylcarbonyldioxy)-3-methoxymethylmorphinan was dissolved in 140 ml. of methanol and 220 ml. of 1N aqueous hydrochloric acid was added. After this mixture has been stirred at room temperature for 56 hours, the solution was made basic with concentrated ammonium hydroxide at ice bath temperature. The methanol was then removed under reduced pressure at 36°. The resulting aqueous suspension was extracted with chloroform (3 × 120 ml.). The combined extracts were dried and concentrated to a residue which was crystallized from ethanol to give 8.1 g. (80 percent) of 7,8-didehydro-4,5α-epoxy-17-methyl-6α-(2,2,2-trichloroethylcarbonyldioxy)morphinan-3-ol, mp 190°–192°, $[\alpha]_D^{25}$ −168° (c 1.19, MeOH).

Analysis Calcd. for $C_{20}H_{20}Cl_3NO_5$ (460.73): C, 52.24; H, 4.38; N, 3.04. Found: C, 52.47; H, 4.32; N, 2.93;

EXAMPLE 19

Preparation of 7,8-didehydro-4,5α-epoxy-17-methylmorphinan-3,6α-diol-6-dimethylcarbamate from 7,8-didehydro-4,5α-epoxy-17-methyl-6α-(2,2,2-trichloroethylcarbonyldioxy)morphinan-3-ol 12.4 g. of 7,8-Didehydro-4,5α-epoxy-17-methyl-6α-(2,2,2-trichloroethylcarbonyldioxy)morphinan-3-ol was added to 150 ml. of dry benzene and the suspension heated at reflux. A constant stream of dimethylamine was bubbled through the suspension for 3 hours after which time a clear solution resulted. Removal of the benzene under vacuum and crystallization of the residue from chloroform-ethyl acetate gave 7.8 g. (81 percent) of 7,8-didehydro-4,5α-epoxy-17-methylmorphinan-3,6α-diol-6-dimethylcarbamate, mp 260°–261°, $[\alpha]_D^{25}$ −141.5° (c 0.54, MeOH).

Analysis Calcd. for $C_{20}H_{24}N_2O_4$ (356.42): C, 67.40; H, 6.79; N, 7.86. Found: C, 67,68; H, 6.58; N, 7.58.

EXAMPLE 20

Reaction of 7,8-didehydro-4,5α-epoxy-17-methylmorphinan-3,6α-diol-6-dimethylcarbamate with N,N-dimethylformamide di-t-butyl acetal A mixture of 3.4 g. of 7,8-didehydro-4,5α-epoxy-17-methylmorphinan-3,6α-diol-6-dimethylcarbamate and 3.4 g. of N,N-dimethylformamide di-t-butyl acetal was heated at 100° for 4 hours under nitrogen during which time a clear solution was obtained. The excess of reagent was removed under vacuum and the residue was extracted with ether (3 × 40 ml.). The combined ethereal solution was washed with 2N sodium hydroxide (2 × 30 ml.) then with water and dried. Removal of the solvent under vacuum yielded 2.31 g. (59 percent) of crude 3-t-butoxy-7,8-didehydro-4,5α-epoxy-17-methylmorphinan-6α-ol dimethylcarbamate. In a previous run, a sample of this compound was distilled, bp 180°–190°10.22 mm., $[\alpha]_D^{25}$ −137.8° (c 1.09, MeOH).

Analysis Calcd. for $C_{24}H_{32}N_2O_4$ (412.49): C, 69.88; H, 7.82; N, 6.79. Found: C, 69.98; H, 7.93; N, 6.99.

EXAMPLE 21

Hyrolysis of 3-t-butoxy-7,8-didehydro-4,5α-epoxy-17-methylmorphinan-6α-ol dimethylcarbamate 2.2 g. of 3-t-Butoxy-7,8-didehydro-4,5α-epoxy-17-methylmorphinan-6α-ol dimethylcarbamate was dissolved in 14 ml. of ehtanol, and 2.0 g. of potassium hydroxide in 15 ml. of ethanol was added. After this mixture had been heated under reflux for 16 hours, the ethanol was removed under vacuum and the resulting aqueous suspension was extracted with chloroform (120 ml.). The chloroform solution was washed with water, dried and removal of the solvent under vacuum yielded 1.9 g. (100 percent) of crude 3-t-butoxy-7,8-didehydro-4,5α-epoxy-17-methylmorphinan-6α-ol.

EXAMPLE 22

Preparation of 3,3', 6α, 6α'-dicarbonyldioxybis-7,8-didehydro-4,5α-epoxy-17-methylmorphinan A mixture of 2.0 g. of 7,8-didehydro-4,5α-epoxy-17-methyl-6α-(2,2,2-trichloroethylcarbonyldioxy)morphinan-3-ol and 8.0 g. of N,N-dimethylformamide di-t-butyl acetal was heated at reflux temperature under nitrogen for 2 hours. The excess of reagent was removed under vacuum and the residue was triturated with ether (2 × 20 ml.). The combined ethereal solution was washed with 2N sodium hydroxide (3 × 20 ml.), then with water and dried. Removal of the solvent under vacuum yielded 150 mg. (9.7 percent) of crude 3-t-butoxy-7,8-didehydro-4,5α-epoxy-17-methylmorphinan-6α-ol dimethylcarbamate. The ether insoluble residue was extracted with hot ethyl acetate. Removal of the solvent under vacuum and crystallization of the residue from ethyl acetate gave 360 mg. (13 percent) of 3,3', 6α, 6α'-dicarbonyldioxybis-7,8-didehydro-4,5α-epoxy-17-methylmorphinan, mp. 230°–240°, $[\alpha]_D^{25}$ −364° (c 0.97, MeOH).

Analysis Calcd. for $C_{36}H_{34}N_2O_8$ (622.65): C, 69.44; H, 5.50; N, 4.50. Found: C, 69.26; H, 5.64; N, 4.25.

EXAMPLE 23

Preparation of t-butyl phenyl ether

A mixture of 2.35 g. of phenol and 10.2 g. of N,N-dimethylformamide di-t-butyl acetal was heated at 100° for 3 hours under nitrogen, during which time a clear solution was obtained. Then an additional 5.1 g. of N,N-dimethylformamide di-t-butyl acetal was added and the heating was continued for 2 hours. The cooled reaction mixture was diluted with ether (300 ml.) and washed successively with 2N sodium hydroxide (2 × 100 ml.) and water (2 × 100 ml.). The ethereal solution was dried and concentrated to give 2.27 g. (61 percent) of crude t-butyl phenyl ether which after Kugelrohr distillation (10 mmHg) gave 1.45 g. (39 percent) of t-butyl phenyl ether, bp 70°–71°/11 mm.).

Analysis Calcd. for $C_{10}H_{14}O$ (150.21): C, 79.96; H, 9.39. Found: C, 79.78; H, 9.14.

EXAMPLE 24

Preparation of t-butyl l-naphthyl ether

A mixture of 3.6 g. of l-naphthol and 10.2 g. of N,N-dimethylformamide di-t-butyl acetal was heated at 100° for 3 hours under nitrogen, during which time a clear solution was obtained. Then an additional 5.1 g. of N,N-dimethylformamide di-t-butyl acetal was added, and the heating was continued for 2 hours. The cooled reaction mixture was diluted with ether (300 ml.) and washed successively with 2N sodium hydroxide (2 × 150 ml.) and water (2 × 150 ml.). The ethereal solution was dried and concentrated to give 0.8 g. (16 percent) of crude t-butyl l-napthyl ether which after Kugelrohr distillation (0.5 mm Hg) afforded 0.45 g. (9 percent) of pure t-butyl l-naphthyl ether.

Analysis Calcd. for $C_{14}H_{16}O$ (200.27): C, 83.96; H, 8.05. Found: C, 83.76; H, 7.88.

EXAMPLE 25

Preparation of N,N-dimethylformamide di-t-butyl acetal 59.5 g. of N,N-Dimethylformamide dimethyl acetal and 147 ml. of dry t-butanol were combined in a three-necked flask (250 ml.), fitted with a thermometer, magnetic stirrer, nitrogen inlet and a 33 × 1.9 cm. silvered vacuum-jacketed Goodloe column which was equipped with a reflux controlled takeoff distilling head, and the mixture was heated at reflux for 1 hour. Then, 300 mg. of 2,4,6-tri-t-butylphenol was added to the solution. The reaction mixture was heated at 110°–115° for 48 hours during which time, at the rate of two drops/min., 56 ml. of distillate was collected. Another 50 ml. of t-butanol was added to the reaction mixture and the removal of methanol was continued as above for an additional 42 hours to afford 64 ml. of distillate. Distillation of the crude product with a similar, but smaller column (20 × 1.4 cm.) gave the following fractions:

| Fraction | Weight | Boiling Point | Glc-analysis |
|---|---|---|---|
| 1 | 18.1 g. | 34–37°/70 mm Hg | MeOH and t-BuOH |
| 2 | 19.2 g. | 56–80°/40 mm Hg | 69% A, 12% B and 19% DMF |
| 3 | 8.1 g. | 85–89°/40 mm Hg | 23% A, 73% B and 3% DMF |
| 4 | 53.2 g. | 91–93°/40 mm Hg | B, and trace of DMF |

A = N,N-dimethylformamide t-butyl methyl acetal
B = N,N-dimethylformamide di-t-butyl acetal Vapor phase chromatography (glc) was performed on a Hewlett-Packard Model 5750 gas chromatographic unit with thermal conductivity cells and helium as the carrier gas. A 6 ft. × 0.25 inch stainless steel column of 5 percent SE-30 on 100–120 mesh AW-DMCS chromosorb W was used with a helium flow rate of 67 cc/min. The oven temperature was programmed at 10° per minute from 50°–150°. The retention time of N,N-dimethylformamide di-t-butyl acetal was 7.2 minutes. Thus, 53.2 g. (52 percent) of N,N-dimethylformamide di-t-butyl acetal of high quality (98 percent pure) was obtained.

EXAMPLE 26

Preparation of salicylic acid acetate t-butyl ester from acetylsalicylic acid

A mixture of 2.2 g. of acetylsalicylic acid and 5.1 g. of N,N-dimethylformamide di-t-butyl acetal was stirred at room temperature for 30 minutes under nitrogen, during which time a clear solution was obtained. The reaction mixture was diluted with chloroform (100 ml.) and washed successively with 2N sodium hydroxide (3

× 75 ml.) and water (2 × 50 ml.). The chloroform solution was dried and concentrated to give 1.25 g. (43.6 percent) of crude salicylic acid acetate t-butyl ester. For analysis, a sample of this salicylic acid acetate t-butyl ester was recrystallized from ether, mp 46°–47.5°.

Analysis Calcd. for $C_{13}H_{16}O_4$ (236.26): C, 66.09; H, 6.83. Found: C, 65.75; H, 6.56.

We claim:

1. A process for the preparation of substantially pure N,N-dimethylformamide di-t-butyl acetal, which comprises the acid-catalyzed trans-acetalization of N,N-dimethylformamide dimethyl acetal with tertiary butanol, wherein said acid is a sterically, highly hindered phenol, and the simultaneous removal of the formed methanol, whereby substantially pure N,N-dimethylformamide di-t-butyl acetal is obtained.

2. A process in accordance with claim 1, wherein the acid catalyst is 2,4,6-tri-t-butyl phenol.

3. A process in accordance with claim 1, wherein the acid catalyst is 2,6-di-t-butyl phenol.

* * * * *